Feb. 24, 1970     A. R. NUGARUS     3,496,910

LIQUID FILM COATING APPARATUS AND METHOD

Filed Aug. 16, 1965     6 Sheets-Sheet 1

INVENTOR
ANTHONY R. NUGARUS
BY
ATTORNEYS

Feb. 24, 1970 A. R. NUGARUS 3,496,910
LIQUID FILM COATING APPARATUS AND METHOD
Filed Aug. 16, 1965 6 Sheets-Sheet 2

INVENTOR
ANTHONY R. NUGARUS
BY
ATTORNEYS

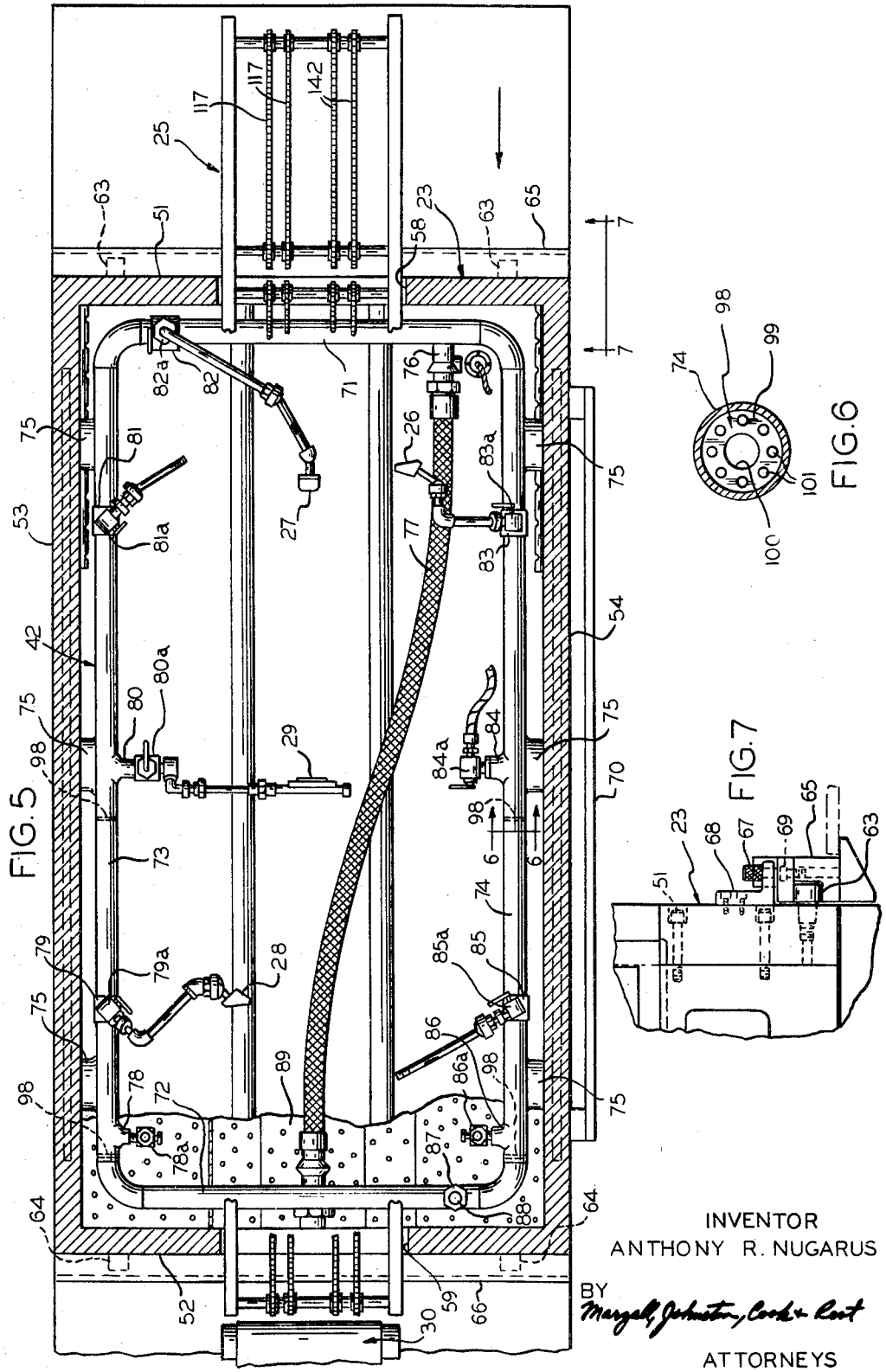

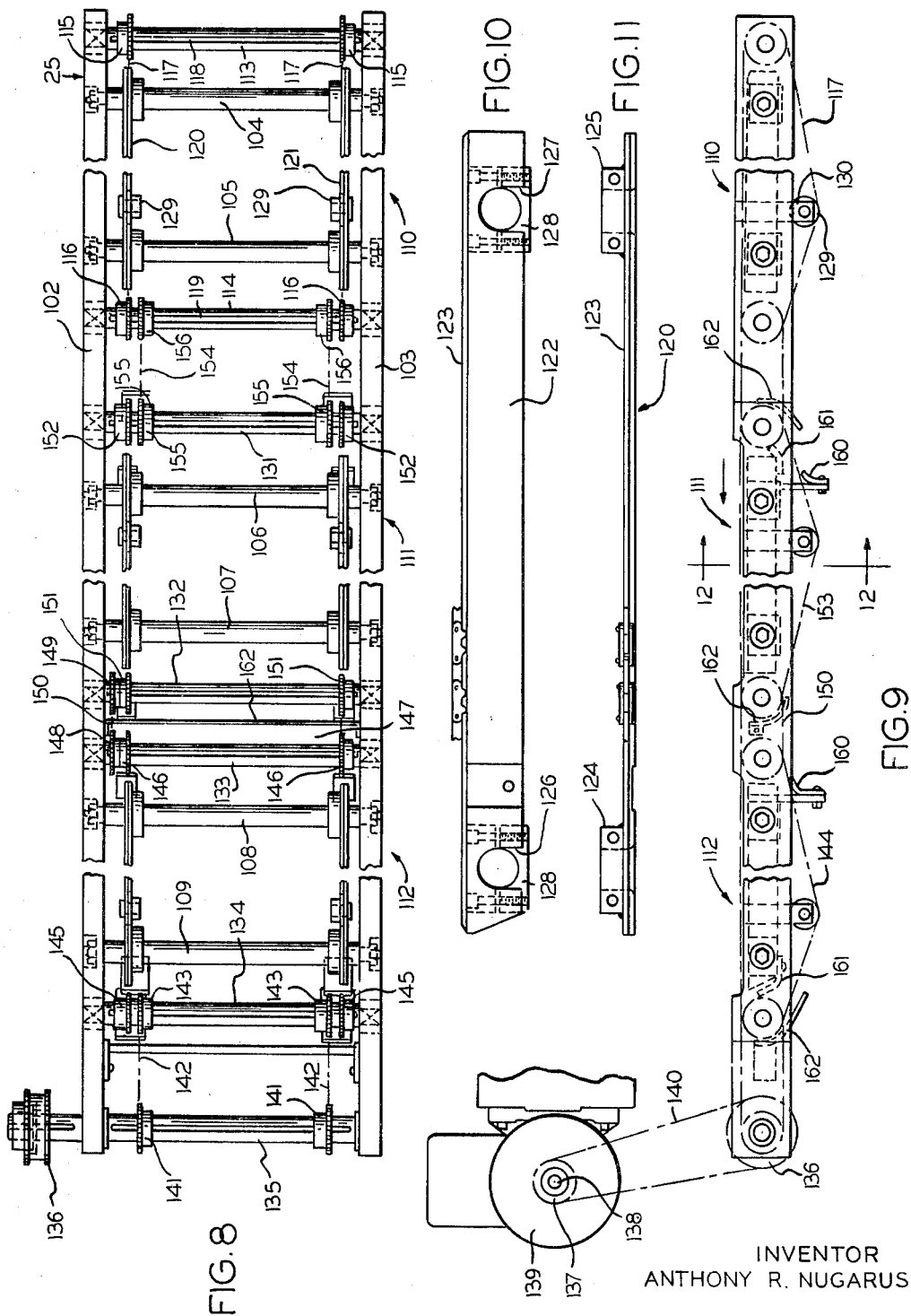

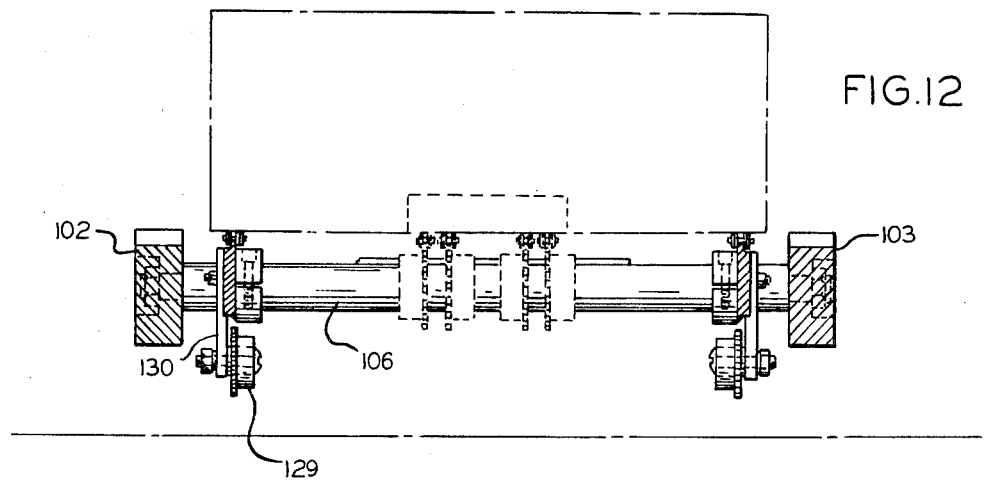
FIG.12
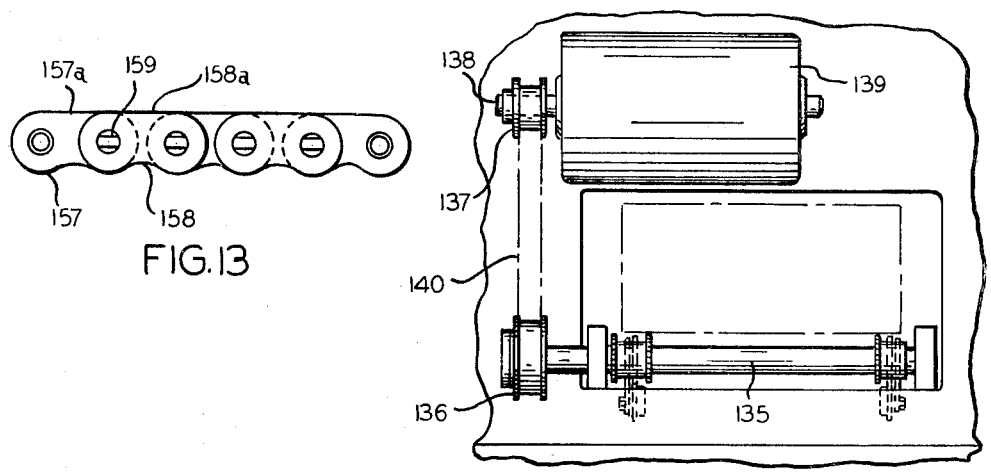
FIG.13
FIG.14
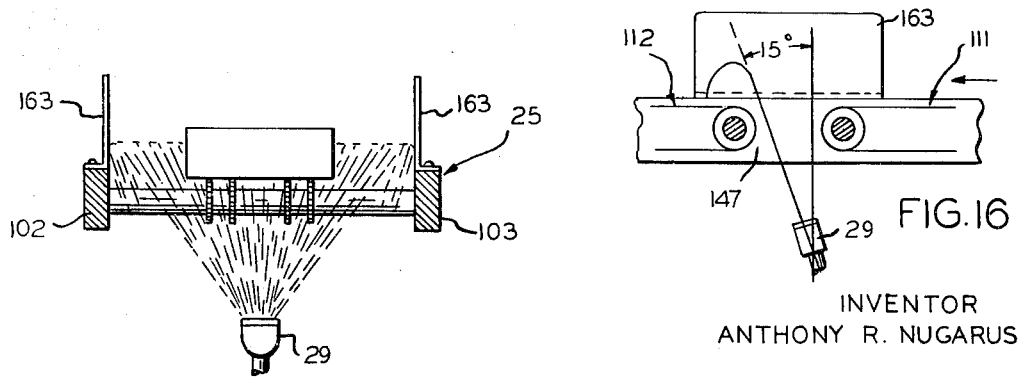
FIG.15
FIG.16
INVENTOR
ANTHONY R. NUGARUS
BY
ATTORNEYS Feb. 24, 1970    A. R. NUGARUS    3,496,910
LIQUID FILM COATING APPARATUS AND METHOD
Filed Aug. 16, 1965    6 Sheets-Sheet 6

INVENTOR
ANTHONY R. NUGARUS
BY
Marzall, Johnston, Cook & Root
ATTORNEYS

United States Patent Office 3,496,910
Patented Feb. 24, 1970

3,496,910
LIQUID FILM COATING APPARATUS AND METHOD
Anthony R. Nugarus, Chicago, Ill., assignor to Crompton & Knowles Corporation, Worcester, Mass., a corporation of Massachusetts
Filed Aug. 16, 1965, Ser. No. 480,061
Int. Cl. B05c 9/00
U.S. Cl. 118—603　　　　　　　　　　　　　　6 Claims

ABSTRACT OF THE DISCLOSURE

Apparatus for packaging articles by applying to the articles a film of material in a heated liquid state that hardens at normal room temperature. A conveyer carries the articles through a heated chamber in which a plurality of nozzles are arranged to discharge unbroken films of material that impinge on the articles and package same. A bottom coater issues a fan-shaped film upwardly to engage and coat the bottoms of the articles. De-aerating apparatus is provided to de-aerate the material discharged from the nozzles, and this apparatus includes a screen arranged below the conveyer having sharp edges for breaking air bubbles in the material dripping therefrom, and baffles in the manifold feeding the material to the nozzles.

---

This invention relates in general to the packaging of articles, and more particularly to the method and apparatus for packaging of articles by the application thereto of a film of material in a liquid state that transforms into a solid or congealed state.

The method of packaging according to the present invention involves generally the production of a hot liquid coating material in the form of an unbroken film and through which articles are advanced on a conveyer to receive a thin, uniform coating of the material in a predetermined thickness, which material defines an air-tight jacket about the article and which is rigid enough to be self-supporting. The jacket has a smooth outer surface, uniform in thickness and imperforate. The coating may be applied to food or non-food products, and is edible or peelable depending upon the needs of the coated product. It can be appreciated that the coating or jacket protects an article from moisture, dehydration, discoloration, contamination, and other deterioration to any appreciable extent.

In general, the articles to be coated are advanced along a conveyer and through a relatively closed coating chamber within which are created thin, planar films of coating material. The coating chamber is heated to a temperature that will maintain the coating material in liquid form other than when it impinges on an article that cools the material to a state of congealment. Nozzles of any desired type, but preferably like those disclosed and claimed in my copending application, Ser. No. 459,660, filed May 28, 1965, abandoned in lieu of Ser. No. 657,425, filed July 31, 1967, and now U.S. Patent No. 3,383,054 are connected to a source of pressurized coating material. The coating chamber is situated over a tank into which the coating material is initially placed and within which the coating material is maintained in liquid state. Suitable heating means is provided in the tank for heating the coating material. A suitable pump is provided for taking material from the tank and pumping it through nozzles for creating the films. A single manifold is employed to feed the pressurized coating material to the nozzles, although any number of manifolds may be used if so desired. Inasmuch as the coating materials employed are of the type that pick up air, suitable deaerating means is provided for removing air from the coating material prior to discharge from the nozzles. Excess coating material discharged from the nozzles drops back into the tank to be recirculated.

After leaving the coating chamber, the articles are subjected to a cooling process to quickly solidify the coating material and cause it to tightly contact the articles. While the cooling action may be provided by any suitable means, it will be shown herein that the articles are carried along a cooling member that has been cooled to a sub-freezing temperature. very quick congealing by the coating process allows immediate handling of the packaged articles so that they may be further processed in accordance with the prescribed production program.

Articles in the coating chamber may be coated on any one or all sides, the top and bottom, depending upon the specifications of the package needed. It is also possible to coat articles carried on a tray or the like, wherein the articles are further secured to the tray by the coating material to define a completed package. The shape and/or size of an article is immaterial as the coating process will apply to any shape or size within the size capabilities of the coating machine.

The coating materials employed are solid at ordinary room temperatures and viscous liquids when heated to application temperatures. Further, the materials may be transparent or opaque and of any desired color. Where more than one film is created within the coating chamber, it should be appreciated that each film need not be of the same type of coating material as to color, characteristics or the like. The coating materials prevent moisture loss, retard microbial growth and are preferably non-exuding, non-toxic, cohesive and easily removed by stripping or peeling. Further, coated products are afforded protection from dehydration, freezer burn, discoloration and rancidity.

It is therefore an object of this invention to provide a novel packaging method and apparatus for quickly and economically packaging food and non-food products.

Another object of this invention is in the provision of a novel packaging method and apparatus that applies a relatively thin, uniform in thickness, transparent or otherwise protective coating to food or non-food products that may be stripped or peeled when it is desired to use the product.

Still another object of this invention resides in the provision of a packaging method and apparatus for packaging of food and non-food products including successively advancing products through a coating chamber within which films of unbroken coating material are created and applied to the articles under such control as to give a desired film thickness.

A further object of the invention is to provide a packaging method and apparatus for applying a film of coating material to articles in a coating chamber that is heated for maintaining the film applying condition, and wherein means is provided for cooling of the coated article after it leaves the coating chamber to quickly congeal the coating for handling thereafter and for causing the coating to intimately contact the article.

Another object of the invention is to provide means for use in a packaging method and apparatus according to the present invention for deaerating the coating material prior to application to products.

Still another object of this invention is in the provision of apparatus for effectively and efficiently coating the bottom of articles advancing along a conveyer.

Still another object of this invention is to provide in a packaging apparatus for packaging articles by coating same with a material that is liquid at elevated temperatures and solid at normal room temperatures, a conveyer along which the articles are advanced during the coating process which is novel and capable of properly supporting and conveying articles to be coated through a coating chamber, and which may be suitably adjusted to handle articles of varying sizes and shapes.

A further object of this invention is in the provision of a method of coating articles that includes advancing articles successively through a coating chamber and directing one or more films of coating material toward the articles as they pass through the coating chamber to apply a uniform coating of material thereon, and wherein the velocities of the films are so coordinated as to enable the proper coating to be applied.

A still further object of this invention resides in the provision of a method for coating articles that includes passing the articles through a heated coating chamber, creating films of unbroken coating material and directing same against the articles within the coating chamber, and subjecting the articles to a cooling process after they have left the coating chamber.

Other objects, features and advantages of the invention will be apparent from the following detailed disclosure, taken in conjunction with the accompanying sheets of drawings, wherein like reference numerals refer to like parts, in which:

FIG. 5 is a top plan view of the coating machine tank, with some parts broken away and others in section for purposes of clarity, and showing the discharge manifold to which the nozzles are connected and a part of the other associated components;

FIG. 6 is an enlarged transverse sectional view of a part of the manifold and taken substantially along line 6—6 of FIG. 5;

FIG. 7 is an enlarged fragmentary elevational view of a part of the cabinet and especially showing the side mounting of the cabinet to the tank;

FIG. 8 is a broken top plan view of the conveyer in one form as employed in the packaging machine of the invention;

FIG. 9 is a side elevational view of the conveyer of FIG. 8 and also broken for clarification;

FIG. 10 is a side elevational view of a chain guide plate employed in the conveyer of FIGS. 8 and 9;

FIG. 11 is a top plan view of the chain guide plate of FIG. 10;

FIG. 12 is a transverse sectional view of the conveyer and taken substantially along line 12—12 of FIG. 9, for illustrating the adjustability thereof;

FIG. 13 is a side elevational view of a part of the chain employed in the conveyer embodiment illustrated;

FIG. 14 is fragmentary view of the same end of the cabinet as in FIG. 3, illustrating a large article passing through the discharge end of the cabinet;

FIG. 15 is a transverse sectional view taken through the conveyer and illustrating the bottom coater for coating of the bottoms of articles according to the invention;

FIG. 16 is a somewhat diagrammatic side elevational view of the bottom coater of FIG. 15;

Figure 1:
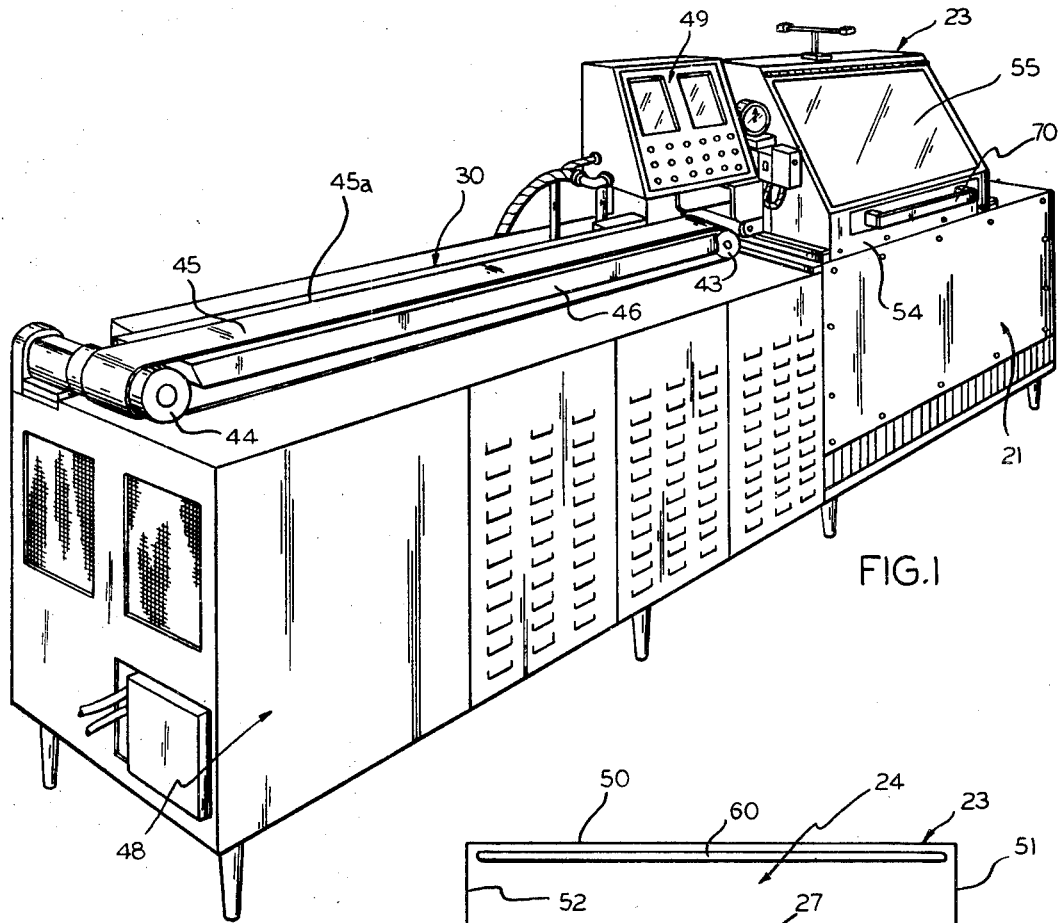
FIG. 1 is a perspective view of a packaging apparatus according to the present invention.
Figure 2:
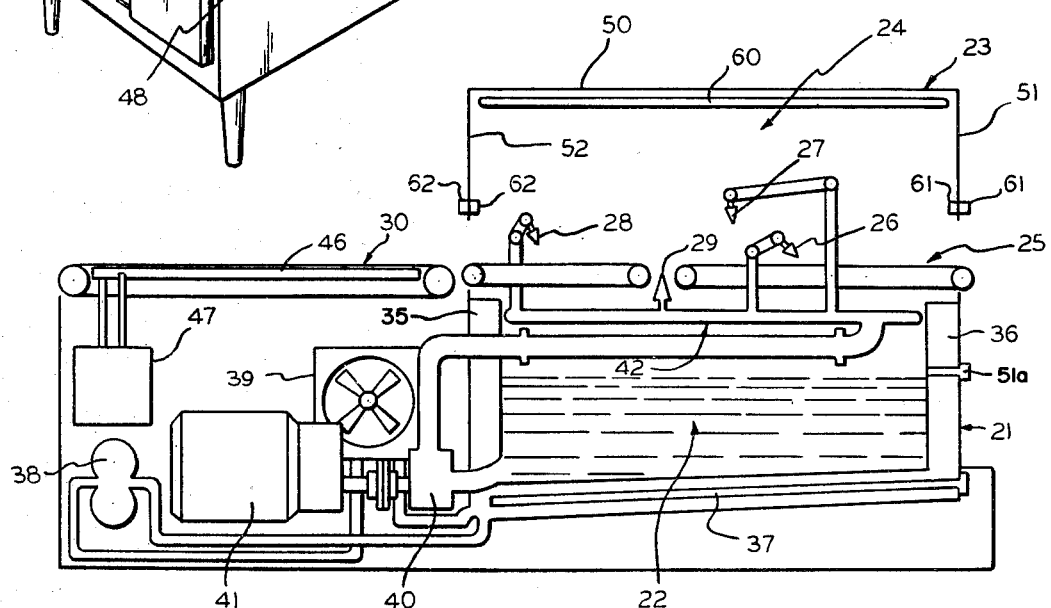
FIG. 2 is a diagrammatic side elevational view of the packaging machine of the present invention.

Referring now to the drawings, and particularly to FIGS. 1 and 2, the packaging machine of the present invention includes generally a melt tank 21 for holding and melting a suitable coating material 22, a coating cabinet 23 defining therein a coating chamber 24 arranged over the tank 21, a conveyer 25 for advancing articles successively through the coating chamber 24, and a plurality of coating nozzles 26, 27, 28 and 29 for discharging fan-shaped unbroken films of coating material toward articles being advanced on the conveyer 25. When the articles are discharged from the coating chamber 24, they are moved along a cooling conveyer 30 for cooling of the coated packages to quickly congeal the coating material and cause it to intimately engage the surface of the articles coated.

In order to maintain the coating material 22 in condition for coating application by maintaining it at a suitable elevated temperature, the tank 21 includes opposed hollow walls 31 and 32 and a hollow bottom 33 through which a heating medium is pumped. Additionally, a plurality of longitudinally extending tubes 34 connected to the opposite end walls which are also hollow carry the heating medium through the center of the coating material. The opposite end walls are generally indicated by the numerals 35 and 36. A plurality of immersion heating units, preferably electrically operated, are arranged in the bottom 33 and indicated by the numeral 37, FIG. 20. The heating media may be of any suitable oil and is circulated throughout the baffle passageways in the tank walls and bottom and the tubes by means of a pump 38 which is also interconnected with a suitable heat exchanger 39 that serves to control the temperature of the oil to further control the proper temperature of the coating material.

The coating material is discharged under a suitable pressure from the coating nozzles 26–29 by means of a positive displacement pump 40 driven by a motor 41. The inlet to the pump 40 is connected to the supply of coating material 22 in the tank 21 and the outlet is connected to a manifold 42 arranged within the coating cabinet 23. Each of the coating nozzles is in communication with the manifold 42, and it should be appreciated that a greater or lesser number of nozzles than shown may be employed. The pump 40 is capable of handling highly viscous coating materials at relatively high temperatures.

The cooling conveyer 30 includes longitudinally spaced pulleys 43 and 44 having an endless belt trained thereover with the upper run 45a being substantially coplanar with the upper run of a conveyer 25, and the intake end being spaced adjacent to the discharge end of the conveyer 25. The belt 45 is preferably of a silicone rubber although it may be of any suitable material that has good heat transfer capabilities. In order to impart a cooling action to the articles carried by the cooling conveyer 30, the upper run is supported on a cooling plate 46 that is suitably constructed and maintained at a subfreezing temperature, about 28–30° F., by means of a refrigeration unit 47. The refrigeration unit 47, pumps 38 and 40, heat exchanger 39, motor 41 and other necessary operating components are all mounted in a housing 48 upon which the cooling conveyer 30 is supported. Suitable driving means are provided for operating the cooling conveyer 30. As also seen in FIG. 1, a control panel 49 serves to control the operation of the entire machine.

The coating materials that may be employed in the machine of the present invention may be of any suitable type that can be applied in liquid form at elevated temperatures and which will solidify or congeal at ordinary room temperatures. For example, the coating materials may be wax blends, polyethylenes, cellulosic blends, polypropylenes, extendible plastics, or any combination of these materials. A suitable edible coating material could be derived from amylose starch. These materials may have a viscosity range of 100–100,000 centipoises and applicable at a temperature of 100–600° F. under a pressure of 250–5,000 pounds per square inch. The pressure required is a function of viscosity and specific gravity of the coating material, length of film desired, velocity of film and design of the coating nozzle. The thickness of a film on an article may vary from 1 mil to over 60 mils depending upon what is needed, and the thickness is controlled by the speed of the coating conveyer 25, the velocity and positioning of the films, and the spacing of the coating nozzles from the article to be coated. The unbroken films discharged from the nozzles are usually of a size greater than the article to be coated and the excess coating material drops back into the tank for recirculation. Since the area of the projected film or sheet is larger than the area to be coated, the coating is laid unbrokenly to the surface that passes through the projected film. Because the films created at the sides of the conveyer project across the path of the article being coated, the portion of the film not broken by the article contacting surface continues unbrokenly across the top of the article without contacting the top surface thereof. Thus, it is possible to coat the sides of an article and leave the top uncoated, or cover the top of an article with a coating of a different color or a different transparency.

Figure 3:
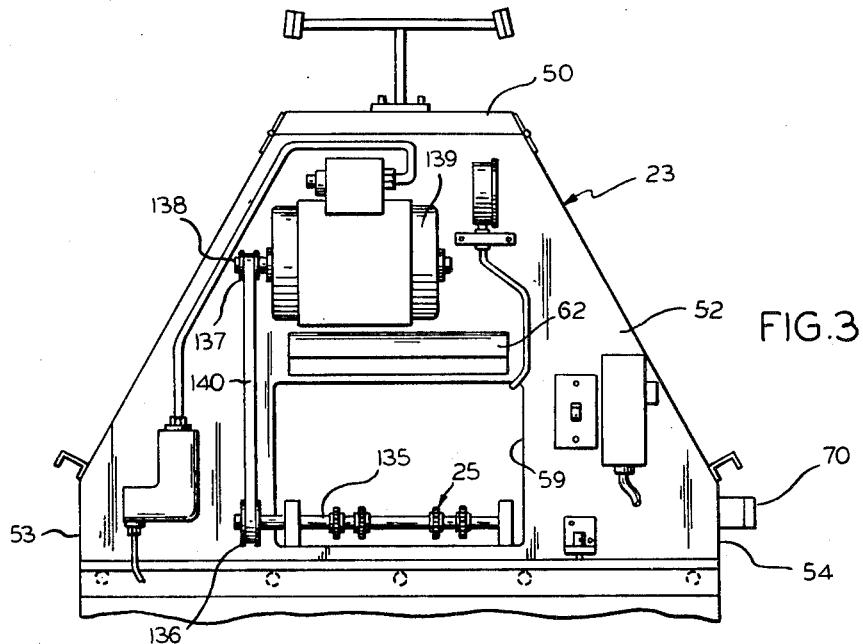
FIG. 3 is an end elevational view of the cabinet that defines the coating chamber and looking at the discharge end of the conveyer.
Figure 4:
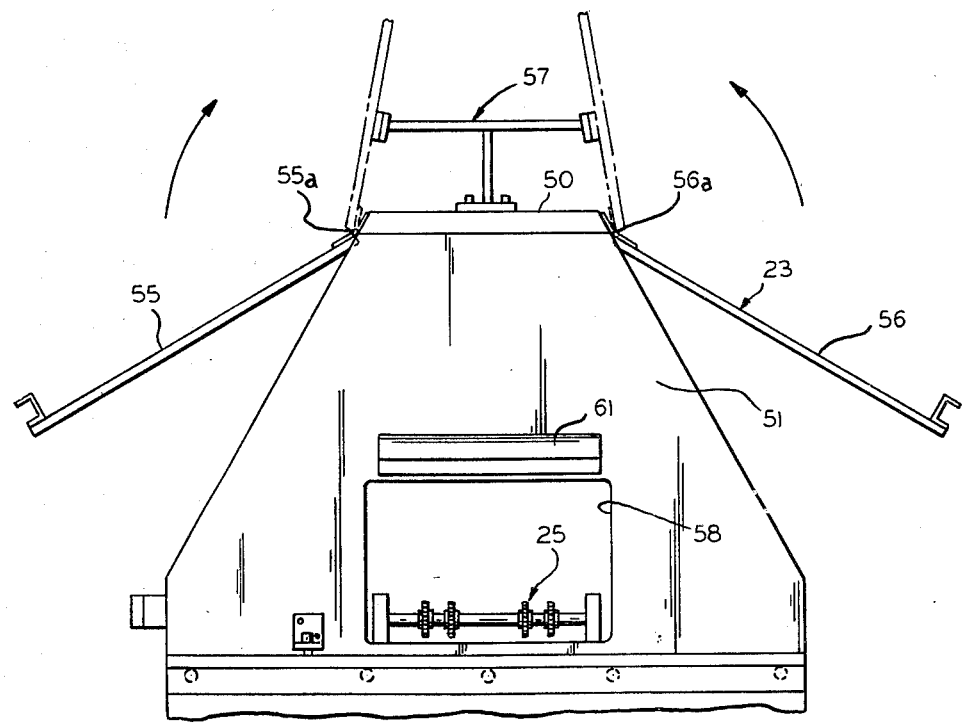
FIG. 4 is an end elevational view of the cabinet and showing the inlet end thereof and of the conveyer that carries articles through the coating chamber.
Figure 17:
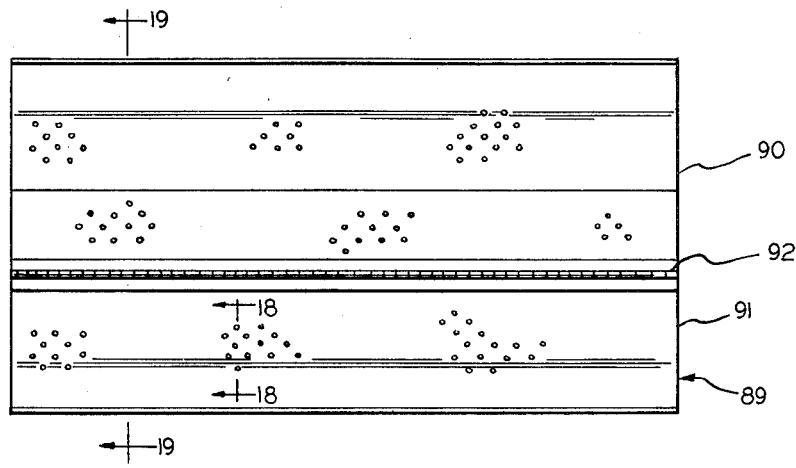
FIG. 17 is a top plan view of the cooling and deaerating plate arranged beneath the conveyer and over the upper open end of the coating material tank.
Figure 18:
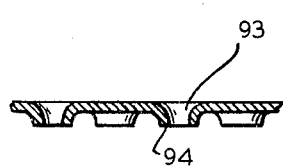
FIG. 18 is a greatly enlarged detail sectional view taken substantially along line 18—18 of FIG. 17.

The coating cabinet 23, as seen in FIGS. 1–7, includes an upper wall or top 50, opposed upstanding end walls 51 and 52, opposed upstanding side walls 53 and 54 and opposed inclined access covers or doors 55 and 56. The cabinet is constructed so that the opposed side walls 53 and 54 extend upwardly from the bottom a short distance to the lower ends of the doors 55 and 56 which are respectively hinged at 55a and 56a to the top wall 50. The top wall 50 is substantially narrower than the lower ends of the end walls 51 and 52, thereby giving the cabinet as seen in FIGS. 3 and 4 a somewhat truncated cone shape. The doors 55 and 56 are preferably transparent so that the operation of the machine can be observed when the cabinet is closed, and access into the coating chamber 24 may be had through either of the doors at any time upon raising them to the elevated positions as shown in phantom in FIG. 4, whereby they rest against a bracket 57. The cabinet is bottomless and therefore completely open to the coating material tank 21. Moreover, the conveyer 25 and manifold 42 are supported on the cabinet 23.

The end wall 51 of the cabinet is provided with an opening 58 in which the inlet end of the conveyer 25 is mounted and through which articles are introduced into the coating chamber 24, while the end wall 52 is provided with an opening 59 in which the discharge end of the conveyer 25 is mounted and through which the coated articles are discharged from the coating chamber 24.

In order to maintain a proper operating temperature within the coating chamber 24 and to also prevent premature hardening or congealing of coating material at the inlet 58 and outlet 59, suitable heating elements are provided. A heating element 60 extends along and is supported from the top wall 50, while heating elements 61 are provided over the opposite sides of the inlet opening 58 and heating elements 62 are provided over opposite sides of the outlet opening 59. While any type of heating element may be employed, it has been found that infrared generating elements have proved satisfactory.

While access to the coating chamber may be had through the doors or covers 55 and 56, further access to the interior of the tank 21 is provided by the mounting of the coating cabinet 23 on the top of the tank 21, wherein the coating cabinet is partially slidable along the top of the tank to thereby open the entire tank to the outside of the machine. In this respect, the opposite end walls 51 and 52 have extending from their lower ends rollers 63 and 64 which are slidably received in tracks 65 and 66, respectively. As seen particularly in FIG. 7, one or more locking pins 67, carried by brackets 68 secured to the side wall, may engage the holes 69 provided at any place along the track 65 for locking the coating cabinet in a desired position along the tank. Inasmuch as the conveyer 25 and the manifold 42 are mounted on the coating cabinet, they will move with the cabinet to fully expose the tank for servicing or for the introduction of a suitable coating material. A handle 70 may be provided along one of the opposed side walls such as shown on the side wall 54 to facilitate moving the coating cabinet 23 or hood along the top of the tank 21.

The manifold 42, as seen particularly in FIG. 5, is generally rectangular in shape and includes an endless pipe or conduit having opposite end sections 71 and 72, and opposite side sections 73 and 74. The manifold is suitably mounted to the opposite side walls 53 and 54 of the coating cabinet by means of brackets 75. Moreover, the manifold 42 is located just under the conveyer 25. An inlet 76 is provided in the end section 71 and connected to a flexible conduit 77 that is in turn connected to the discharge end of the pump 40. Thus, sliding of the cabinet 23 along the tank 21 does not necessitate disconnection of the manifold.

The manifold is provided with a plurality of outlets 78, 79, 80, 81, 82, 83, 84, 85, 86 and 87, any one or more of which may be used at any time for carrying out the coating method according to the invention. As illustrated, each of the outlets has mounted thereon a control valve 78a, etc., with the exception of the outlet 87 which is merely closed by a plug 88. However the outlet 87 may be used if so desired. Further, the embodiment illustrated shows a coating nozzle 28 interconnected to the control valve 79a by suitable pipes, unions and ball connections, while nozzles 26 and 27 are similarly interconnected with valves 83a and 82a, respectively. The nozzle 29 is similarly connected to the control valve 80a, and functions as a part of a bottom coater that will be more clearly hereinafter described. Suitable pipes and fittings are also interconnected with the valves 81a and 85a for the mounting of nozzles thereon if desired in any particular coating procedure. And the valves 84a, 86a and 78a may be employed as bleed valves for bleeding off any air in the manifold during operation thereof. In the embodiment shown in FIG. 5, the arrangement of the nozzles 26, 27, 28 and 29 is such that nozzle 26 will coat the front and one side of an article, while nozzle 27 coats the top thereof, nozzle 28 will coat the other side and back of the article and nozzle 29 will coat the bottom thereof. Any one or more of the nozzles may be removed from operation if desired, depending upon the needs for coating of a particular article. Thus, it can be readily appreciated that any arrangement of nozzles may be employed with the universal manifold 42.

Because of the high heat generated in the cabinet and tank, nitrogen is introduced through nozzles 51a to guard against combustion.

Figure 19:
FIG. 19 is a transverse sectional view of the screen of FIG. 17 and taken substantially along line 19—19 thereof.
Figure 20:
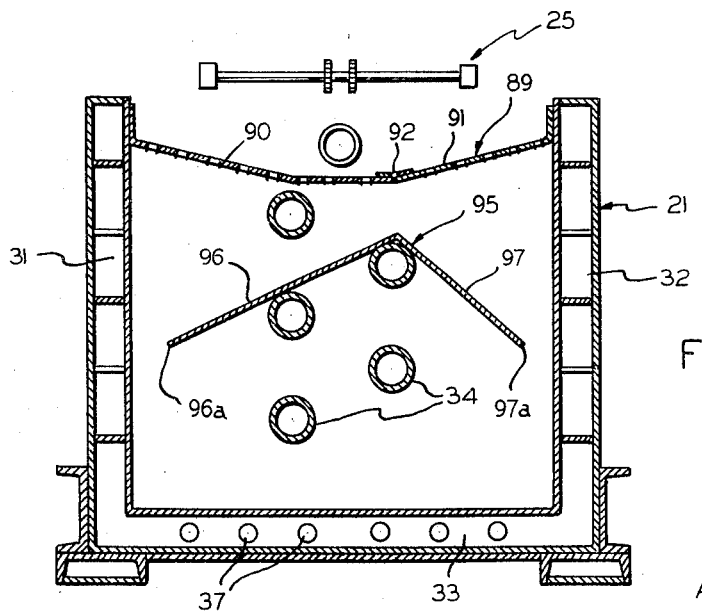
FIG. 20 is a transverse sectional view taken through the coating material tank of the packaging machine of the present invention and also illustrating the position of the cooling screen of FIG. 17.

Coating materials of the type employed with the present invention do not provide a good coating if it has any amount of air therein, for bubbles will appear on the surface of an article coated and tend to give an undesirable color in some instances. Therefore, it is desirable to remove as much air as possible in order to provide efficient coating operation and to obtain a coating of desirably quality. In this respect, material that is excess during the coating operation falls back into the tank 21 but first goes through a collecting screen 89, FIGS. 5, 17, 18, 19 and 20. The collecting screen 89 is somewhat troughshaped as shown in FIGS. 19 and 20, and includes a fixed section 90 and a swingable section 91. The fixed section is preferably mounted along the tank side wall 31, while the swingable section is interconnected with the fixed section by means of a hinge 92, and it is understood that the collecting screen extends over the entire upper open end of the tank 21. The swingable section 91 permits access into the tank for maintenance and for loading the tank with a coating material. The entire collecting screen is perforated to allow the material collected thereon to fall into the tank, and the perforations are preferably formed by punching or otherwise so that each perforation 93 is provided with sharp depending edges 94, wherein material dripping therefrom will have air bubbles broken to thereby remove air from the material. Further, it can be appreciated that the collecting screen 89 functions as a filter screen in that it prevents the dropping of parts or articles into the tank of molten liquid coating material.

Where the coating material employed has a viscosity that is considered quite high or above about 10,000 centipoises, a lower baffle 95 may be additionally employed upon which the dripping coating material from the collecting screen runs down the opposed diverging sections 96 and 97 and drips from the terminal sharp ends 96a and 97a to thereby further remove air bubbles from the coating material.

To further remove air from the coating material, annular baffles 98, FIGS. 5 and 6, are mounted in the manifold. Each baffle 98 includes an annular body 99, the outer edge of which engages the inner diameter of the corresponding manifold pipe, and the inner edge of which defines an opening 100. The body 99 is provided with a plurality of perforations 101, all of which define sharp edges over which the coating material moves to break up air bubbles at that point. It may be noted that the annular baffles 98 are strategically located along the side sections 73 and 74 adjacent to outlets 78, 80, 84 and 86 so that air can be bled out at these points.

Referring again to FIGS. 2 and 5, it will be appreciated that the method of coating for packaging articles includes advancing of the articles through the coating zone 24 by means of a conveyer 25 while the desired number of unbroken films are being directed toward the article in accordance with the desired packaging result. The velocity of a film emanating from a nozzle is such as to cause the film to extend properly into the path of movement of an article so that the desired thickness and coating on the article can be accomplished. Spacing of a nozzle closer to an article results in obtaining a thicker coating thereon, while retracting the nozzle away from the article results in obtaining a thinner coating thereon. The velocity of the film emanating from the side nozzles 26 and 28 is much lower than the velocity of the film emanating from the upper nozzle 27. Preferably, the velocity for the upper nozzle is about three times that of each of the side nozzles. The velocity of the nozzle 29 which represents a part of the bottom coater is about one-half the velocity of the side nozzles 26 and 28. Positioning of the side nozzles 26 and 28 is such that the unbroken film which is also planar extends substantially vertically and at an angle of about 5° from a plane extending normal to the path of movement of the articles. The angulation may be toward or away from the article movement. Further, the vertical placement of the side nozzles is preferably such that a line extending through the center of the planar film will substantially coalign with a center line parallel to the article movement path of the article side.

The upper or top nozzle 27 similarly directs an unbroken, generally planar film toward the articles. Further, the film is arranged so that it is angulated from the vertical between about 15 and 70°. Further, the film from the upper nozzle 27 is arranged so that a center line therethrough substantially coaligns with a center line through the article and parallel with the article movement path.

The articles upon leaving the coating chamber 24 are discharged from the conveyer 25 onto the cooling conveyer 30 which thereafter subjects the bottoms of the article to a cooling action that tends to cause the coating to intimately engage all surfaces of the article. It can be appreciated that other cooling means may be employed, and that the cooling conveyer illustrated is only one form. This cooling action is particularly important where it is desired to package and secure articles to trays such as sheets of fiberboard or the like. In such a case, the coating material is not only directed toward all of the surfaces of the article but also toward the upper surface of the tray upon which the article rests in order to provide a continuous film from the article onto the tray and thereby pack the article to the tray. In some instances, the film may not be drawn tightly against the article in the areas immediately surrounding the article at the tray, and the cooling action serves to pull the film down tightly and thereby eliminate any possible bubbling effect about the article adjacent the tray. The velocities of the nozzles intercoact with the speed of the conveyer 25 to provide the proper thickness of coating for an article. The speed of the conveyer 25 must be at least about 150 feet per minute in order to properly control coating thickness. It has been found that the packaging method has operated satisfactorily where the conveyer speed has exceeded 200 feet per minute. Further, in order to provide the proper cooling action by the cooling conveyer 30, it has been found necessary to chill the cooling plate 46 to a temperature of 28–30° F.

The conveyer 25 according to the invention, and as shown in FIGS. 8–14, is capable of advancing the articles quickly and efficiently through the coating chamber while presenting the minimum amount of contact with the bottom of an article transported, and yet being able to handle articles of varying sizes and shapes by making simple and easy adjustments. The conveyer 25 includes a pair of spaced parallel side rails 102 and 103 that are interconnected by a plurality of rail tie bars 104, 105, 106, 107, 108 and 109 to thereby effectively provide a frame for the conveyer. It should be appreciated that a greater or lesser number of rail tie bars may be employed. As illustrated, the conveyer includes a first section 110, a second section 111, a third section 112, all of which intercoact in advancing the articles through the coating zone 24, although it should be appreciated that a greater or lesser number of sections may be employed, depending upon the overall length of the conveyer. As seen in FIG. 5, the conveyer 25 projects through both open ends of the cabinet 23, and the side rails 102 and 103 are suitably secured to the cabinet and preferably the end walls 51 and 52.

The first section 110 includes longitudinally spaced shafts 113 and 114, respectively, having mounted thereon and for corotation therewith sprockets 115 and 116 that are also aligned with each other. The shafts are bearingly mounted at opposite ends in the side rails 102 and 103. While the sprockets 115 and 116 are constructed to have endless chains 117 trained thereover, it should be appreciated that any endless member may be employed which will serve to advance articles along the conveyer. Thus, the term "sprockets" as used herein may also include pulleys designed to have endless cables trained thereover. Each of the shafts 113 and 114 is provided with elongated driving keys 118 and 119 for coacting with suitable grooves in the sprockets to lock the sprockets to the shafts, and also to permit the axial movement of the sprockets along the shafts to adjust the positioning of the chains or cables upon which the articles are conveyed. While two pair of sprockets are shown in FIG. 8 for handling a pair of endless members, it should be appreciated that any number of sprockets and endless members may be employed depending upon the needs for the particular article to be coated, and it can be seen in FIGS. 3–5 that four endless members are provided as illustrative for handling a particular type of article. When cables are employed, it is also necessary to provide a chain and sprocket drive along one side rail to assure proper timing between conveyer sections.

The upper runs of the chains 117 are supported by chain guide plates 120 and 121, one of which is more particularly shown in FIGS. 10 and 11. Each chain guide plate includes an elongated bar-shaped body 122 having a chain guide and support bridge 123 extending along the upper edge thereof for supporting the upper run of the chain. The opposite ends of the body are provided with bosses 124 and 125 having respectively downwardly opening slots 126 and 127 that are adapted to receive the rail tie bars and in the case of the first section 110, the rail tie bars 104 and 105. A retaining member 128 is provided for each slot to fit along the underside of the rail tie bars and to coact with fasteners extending through the chain plates to fix the chain plates in position along the rail tie bars against lateral movement. While only two chain plates are shown in the first section 110, it will be appreciated that there will be one chain plate for each chain or endless member. Further, wherein the endless member is a cable, the upper edge of the chain plates will be so constructed as to give support to the cable. Chain tensioning rollers 129 are provided for each chain plate and are mounted on brackets 130 that may be adjustably positioned to obtain the proper tension in the chain.

The second section 111 is constructed similarly to the first section 110 and includes shafts 131 and 132, and similarly, the third section 112 includes shafts 133 and 134. The second and third sections are also provided with suitable sprockets, chains and chain plates, all of which are adjustable to vary the spacing between adjacent chains to handle articles of varying sizes and shapes.

All conveyer sections are driven by and through a single drive shaft 135 mounted at one of the rails 102 and 103 and having at one end thereof a drive pulley or sprocket 136 that is drivingly connected to a pulley 137 mounted on a shaft 138 of a motor 139 through an endless driving member 140, FIGS. 3, 8 and 9.

Drive sprockets 141 are arranged on the drive shaft 135 and may be adjusted axially therealong, and have trained thereover chains 142 that are also trained over sprockets 143 on the shaft 134 in the third conveyer section 112. The chains 142 serve to transmit a driving force to the third conveyer section 112 and also serve to carry articles from the third conveyer section to the cooling conveyer 30. Article carrying chains 144 are trained about sprockets 145 on the shaft 134 and sprockets 146 on the shaft 133 and which define the third conveyer section 112. The chains 144 also serve to transmit a driving force to the shaft 133. A gap 147 is provided between the second conveyer section 111 and the third conveyer section 112 in order to facilitate the bottom coater as will be more clearly described hereinafter, and therefore the articles must pass over the gap 147 when passing from the second conveyer section 111 to the third conveyer section 112. The second conveyer section 111 is driven by a connection from the third section 112 by means of a sprocket 148 carried on the shaft 133, a sprocket 149 carried on the shaft 132, and an interconnecting drive chain 150, all of which are arranged immediately adjacent to the side rail 102, although it could be arranged at a point adjacent the other side rail 103.

The second conveyer section 111 includes the usual chain guide plates and sprockets 151 on the shaft 132 and sprockets 152 on the shaft 131 having trained thereover chains 153. Thus, a driving force is transmitted from the shaft 132 to the shaft 131 through the chains 153 which also serve to advance articles along the conveyer. The second section 111 is drivingly interconnected to the first section 110 by chains 154 trained over sprockets 155 on the shaft 131 and sprockets 156 on the shaft 114. The chains 154 additionally span the space between the first conveyer section 110 and the second conveyer section 111 to transport the articles therebetween. Thus, the entire conveyer 25 is driven from the shaft 135. Moreover, all shafts are provided with elongated driving keys mating with slots in the sprockets, and so the sprockets may be axially adjusted on the shafts to any desired positions. Set screws may be employed with the sprockets to hold them against axial movement after they have been adjustably positioned.

A preferable chain embodiment is illustrated in FIG. 13, wherein it includes roller link plates 157 interconnected to pin link plates 158 by pins 159 that have rollers mounted thereon. The roller link plates and the pin link plates are arranged in opposed pairs with rollers mounted on the pins extending therebetween. The upper edges of the roller link plates and the pin link plates are flat and indicated by the numerals 157a and 158a in order to define a flat surface upon which the articles may rest when being conveyed through the coating zone.

Inasmuch as the coating materials employed in packaging of articles according to the present invention have a tendency to build upon the various parts of the conveyer, and it is desired that such build up be minimized in order to prevent malfunctioning and breakdown, chain wipers 160 are preferably provided in the second and third sections 111 and 112 to engage the chains therein and wipe excess material therefrom. Similarly, sprocket wipers 161 are preferably provided at the inlet end of the second conveyer section 111 and the discharge end of the third conveyer section 112 to engage and wipe excess material from the sprockets. Preferably, these wipers will be constructed of a silicone rubber, although any other suitable material may be employed. Further, arcuately formed shields 162 are provided adjacent certain sprockets to prevent splashing of coating material and to further wipe off excess build up of coating material. The shields are preferably arranged adjacent the inlet and outlet ends of the second conveyer section 111 and adjacent the outlet end of the third conveyer section 112, although they may be positioned anywhere along the conveyer 25. These shields are preferably of metal and arranged in spaced relations from the sprockets, and extend between the opposed side rails 102 and 103.

When substituting cables and pulleys for the chains and sprockets, it will be appreciated that driving sprockets will be needed between adajacent conveyer sections in order to drive all of the sections in unison. Such chain and sprocket interconnections would be made relative to the shafts and adjacent one of the side rails.

The bottom coater for coating the bottoms of articles passing through the coating zone, when such is desired, includes the nozzle 29 as already mentioned which is positioned below the conveyer 25 and to direct an unbroken fan-shaped film upwardly through the gap 147 defined between the conveyer sections 111 and 112. The unbroken film projects upwardly and slightly in the direction of article movement and is preferably arranged so that the film is inclined about 15° from the vertical. The nozzle 29 is centered with respect to the conveyer. In order to control and support the unbroken film at a position that it will give a proper coating action to the bottom of an article, a pair of opposed side plates 163 are mounted on the opposite side rails 102 and 103 and against which the edges of the film impinge. As seen most clearly in FIG. 16, the film extends upwardly and arcs over and down in the direction of article movement. A shield 162 at the discharge end of the second conveyer section 111 prevents splash of coating material from the sprockets and chain into the film projected by the bottom coater nozzle 29 which would disrupt the film from the nozzle 29. Further, the chain wiper 160 in the third conveyer section 112, being arranged adjacent the inlet end thereof aids in preventing splash of coating material from the chains 144 into the film of the nozzle 29.

It will be understood that modifications and variations may be effected without departing from the scope of the novel concepts of the present invention.

The invention is hereby claimed as follows:

1. A liquid film coating apparatus for packaging articles by coating same with a film of material that is liquid at elevated temperatures and solid at room temperatures, said apparatus comprising an elongated tank defining a reservoir and collecting unit for the coating material, means for maintaining the coating material in said tank at such an elevated temperature that is remains liquid, a cabinet mounted over said tank defining a coating chamber, aligned openings at opposite ends of said cabinet, a conveyer supported by said cabinet extending between and through said openings to carry atricles through the coating chamber, a manifold mounted within said cabinet, said manifold being generally rectangular in shape and arranged at the base of the cabinet, a plurality of outlets in said manifold each having a control valve mounted thereon, a plurality of nozzles for discharging unbroken films of coating material into the path of articles carried on the conveyer, each nozzle being supported by and interconnected with a valve on said manifold, said nozzles including at least one at each side of the conveyer and one above the conveyer, a bottom coater arranged to coat the bottom of the articles and including a nozzle located below the conveyer for discharging upwardly an unbroken fan-shaped film of coating material into the path of the bottoms of articles and upstanding plates at opposite sides of the conveyer for supporting said bottom coater film, means for delivering the liquid coating material from the tank to said manifold under pressure, means within said cabinet for maintaining a predetermined temperature therein, and means outside said cabinet for subjecting the coated articles leaving the coating chamber to a cooling action.

2. In a liquid film coating apparatus for packaging articles by coating same with a film of material that is liquid at elevated temperatures and solid at room temperatures, said apparatus including a tank defining a reservoir and collecting unit for the coating material, a cabinet mounted over said tank defining a coating chamber, aligned openings at opposite ends of said cabinet, a conveyer supported by said cabinet extending between and through said openings to carry articles through said coating chamber, and means for coating the bottoms of articles carried on said conveyer comprising, a nozzle for discharging a fan-shaped unbroken film of coating material into the path of the article bottoms, said nozzle being arranged below the conveyer to direct said fan-shaped unbroken film of coating material upwardly at an incline into the path of article bottoms, and upstanding plates at the sides of the conveyer positioned so that the opposite edges of said film impinge thereon, whereby the plates serve to support said film.

3. A liquid film coating apparatus for packaging articles by coating same with a film of material that is liquid at elevated temperatures and solid at room temperatures, said apparatus comprising an elongated tank defining a reservoir and collecting unit for the coating material, means for maintaining the coating material in said tank at such an elevated temperature that it remains liquid, a cabinet mounted over said tank defining a coating chamber, aligned openings at opposite ends of said cabinet, a conveyer supported by said cabinet extending between and through said openings to carry articles through the coating chamber, a nozzle supported within said cabinet for discharging an unbroken film of coating material into the path of movement of articles carried on said conveyer, a manifold carried by said cabinet, said nozzle being interconnected with said manifold, means for delivering the liquid coating material from the tank to said manifold under pressure, means within said cabinet for maintaining a predetermined temperature therein, means outside said cabinet for subjecting the coated articles leaving the coating chamber to a cooling action, means for deaerating said liquid coating material including a collecting screen arranged below said conveyer onto which all excess liquid is received, said screen having a plurality of perforations therein, and means depending from said perforations defining sharp edges that tend to break air bubbles formed in the liquid coating material.

4. A liquid film coating apparatus for packaging articles by coating same with a film of material that is liquid at elevated temperatures and solid at room temperatures, said apparatus comprising an elongated tank defining a reservoir and collecting unit for the coating material, means for maintaining the coating material in said tank at such an elevated temperature that it remains liquid, a cabinet mounted over said tank defining a coating chamber, aligned openings at opposite ends of said cabinet, a conveyer supported by said cabinet extending between and through said openings to carry articles through the coating chamber, a nozzle supported within said cabinet for discharging an unbroken film of coating material into the path of movement of articles carried on said conveyer, a manifold carried by said cabinet, said nozzle being interconnected with said manifold, means for delivering the liquid coating material from the tank to said manifold under pressure, means within said cabinet for maintaining a predetermined temperature therein, means outside said cabinet for subjecting the coated articles leaving the coating chamber to a cooling action, and means for deaerating said liquid coating material including a annular baffle in said manifold having a plurality of perforations therein.

5. A liquid film coating apparatus for packaging articles by coating same with a film of material that is liquid at elevated temperatures and solid at room temperatures, said apparatus comprising an elongated tank defining a reservoir and collecting unit for the coating material, means for maintaining the coating material in said tank at such an elevated temperature that it remains liquid, a cabinet mounted over said tank defining a coating chamber, aligned openings at opposite ends of said cabinet, a conveyer supported by said cabinet extending between and through said openings to carry articles through the coating chamber, a nozzle supported within said cabinet for discharging an unbroken film of coating material into the path of movement of articles carried on said conveyer, a manifold carried by said cabinet, said nozzle being interconnected with said manifold, means for delivering the liquid coating material from the tank to said manifold under pressure, means within said cabinet for maintaining a predetermined temperature therein, means outside said cabinet for subjecting the coated articles leaving the coating chamber to a cooling action, means for deaerating said liquid coating material including a collecting screen arranged below said conveyer onto which all excess liquid is received, said screen having a plurality of perforations therein, means depending from said perforations defining sharp edges that tend to break air bubbles formed in the liquid coating material, and an annular baffle in said manifold having a plurality of perforations therein.

6. A liquid film coating apparatus for packaging articles by coating same with a film of material that is liquid at elevated temperatures and solid at room temperatures, said apparatus comprising an elongated tank defining a reservoir and collecting unit for the coating material, means for maintaining the coating material in said tank at such an elevated temperature that it remains liquid, a cabinet mounted over said tank defining a coating chamber, aligned openings at opposite ends of said cabinet, a conveyer supported by said cabinet extending between and through said openings to carry articles through the coating chamber, a manifold carried by said cabinet within said coating chamber having a plurality of outlets and a control valve associated with each outlet, a plurality of nozzles for discharging unbroken films of coating material into the path of articles carried on said conveyer, each nozzle being supported by said manifold and interconnected with a valve, means for delivering the liquid coating material from the tank to said manifold under pressure, means within said cabinet for maintaining a predetermined temperature therein, means outside said cabinet for subjecting the coated articles leaving the coating chamber to a cooling action, means for deaerating said liquid coating material including a collecting screen arranged below said conveyer onto which all excess liquid is received, said screen having a plurality of perforations therein, means depending from said perforations defining sharp edges that tend to break air bubbles formed in the liquid coating material, and a plurality of annular perforated baffles in said manifold located adjacent at least some of the outlets thereof.

References Cited
UNITED STATES PATENTS

| | | | |
|---|---|---|---|
| 276,987 | 5/1883 | Winter | 74—230 X |
| 648,866 | 5/1900 | Gibford | 74—230 |
| 843,264 | 2/1907 | Field | 198—190 X |
| 1,282,547 | 10/1918 | Denny | 74—611 |
| 1,389,101 | 8/1921 | Ohrvall | 55—199 X |
| 2,276,481 | 3/1942 | Greer | 118—20 |
| 2,400,315 | 5/1946 | Paasche | 118—324 X |
| 2,646,837 | 7/1953 | Brandenburg et al. | 118—324 X |
| 2,739,567 | 3/1956 | Jones et al. | 118—602 X |
| 3,178,866 | 4/1965 | Wallis. | |
| 3,220,379 | 11/1965 | Wallis. | |

DAVID KLEIN, Primary Examiner

U.S. Cl. X.R.

53—131, 140; 55—206; 99—166; 117—102, 105.1; 118—316, 324